Feb. 26, 1929.  
I. H. JUDD  
1,703,737  
CLAMP  
Filed July 19, 1926    4 Sheets-Sheet 1

INVENTOR.  
Irving H. Judd  
BY  
ATTORNEYS.

Feb. 26, 1929.

I. H. JUDD 1,703,737

CLAMP

Filed July 19, 1926   4 Sheets-Sheet 3

INVENTOR.
Irving H. Judd
BY
ATTORNEYS.

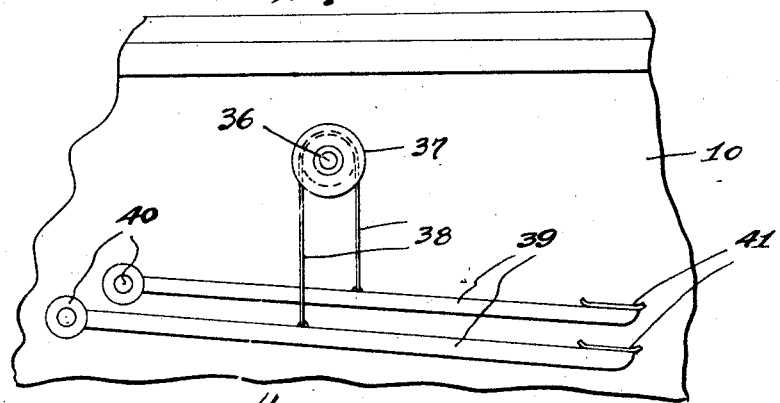
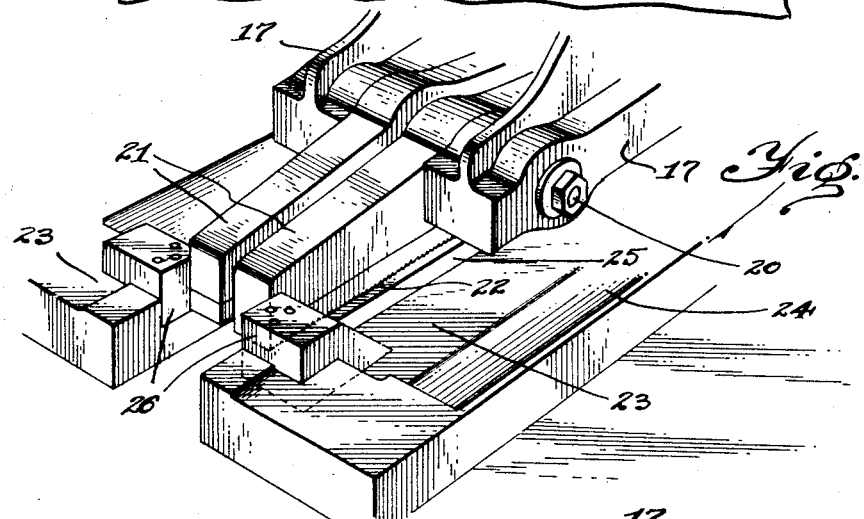
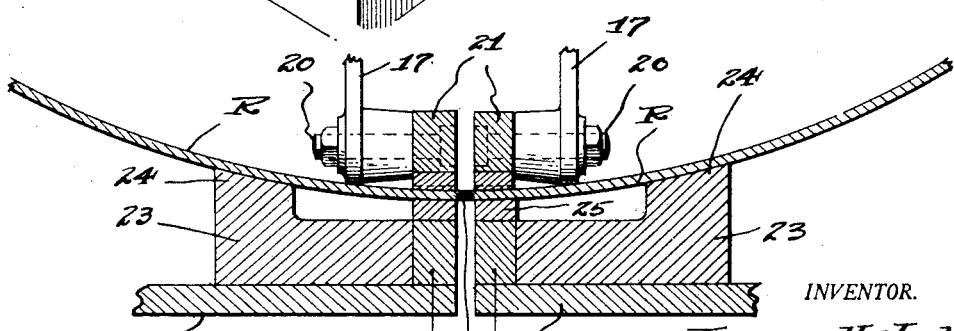

Patented Feb. 26, 1929.

1,703,737

UNITED STATES PATENT OFFICE.

IRVING H. JUDD, OF DETROIT, MICHIGAN, ASSIGNOR TO WHITEHEAD & KALES COMPANY, OF RIVER ROUGE, MICHIGAN, A CORPORATION OF MICHIGAN.

CLAMP.

Application filed July 19, 1926. Serial No. 123,479.

This invention relates to clamps and more especially to improvements therein designed with particular reference to welding machines and the like for use in clamping the ends of the parts to be welded.

Welding machines as heretofore manufactured have, in most instances, been provided only with manually operated clamps which not only required considerable time and effort to operate but also have proved to be relatively inefficient owing to the great pressure required to properly clamp the parts. It is therefore one of the primary objects of this invention to provide clamping mechanism which may be quickly and easily operated and which is capable of exerting a sufficiently great pressure upon the work to positively hold the same during the welding operation. To this end the invention consists in providing a pair of clamps adapted to engage the parts to be welded, each clamp including a rockable bell crank lever provided at the end of one of its arms with a work engaging shoe and having its other arm connected by means of a toggle lever to a fixed element together with fluid pressure means for operating said toggle lever.

The several objects, advantages and novel details of construction of this invention will be made more apparent as this description proceeds, especially when considered in connection with the accompanying drawings wherein:

Figure 4 is a fragmentary detail view of the foot control means for the fluid pressure operating cylinder.

Figure 5 is a fragmentary perspective view showing the connection between the work engaging shoes and the adjacent ends of the bell crank levers, and Figure 6 is a fragmentary detail sectional view taken substantially on the plane indicated by line 6—6 in Figure 3.

Figure 1:
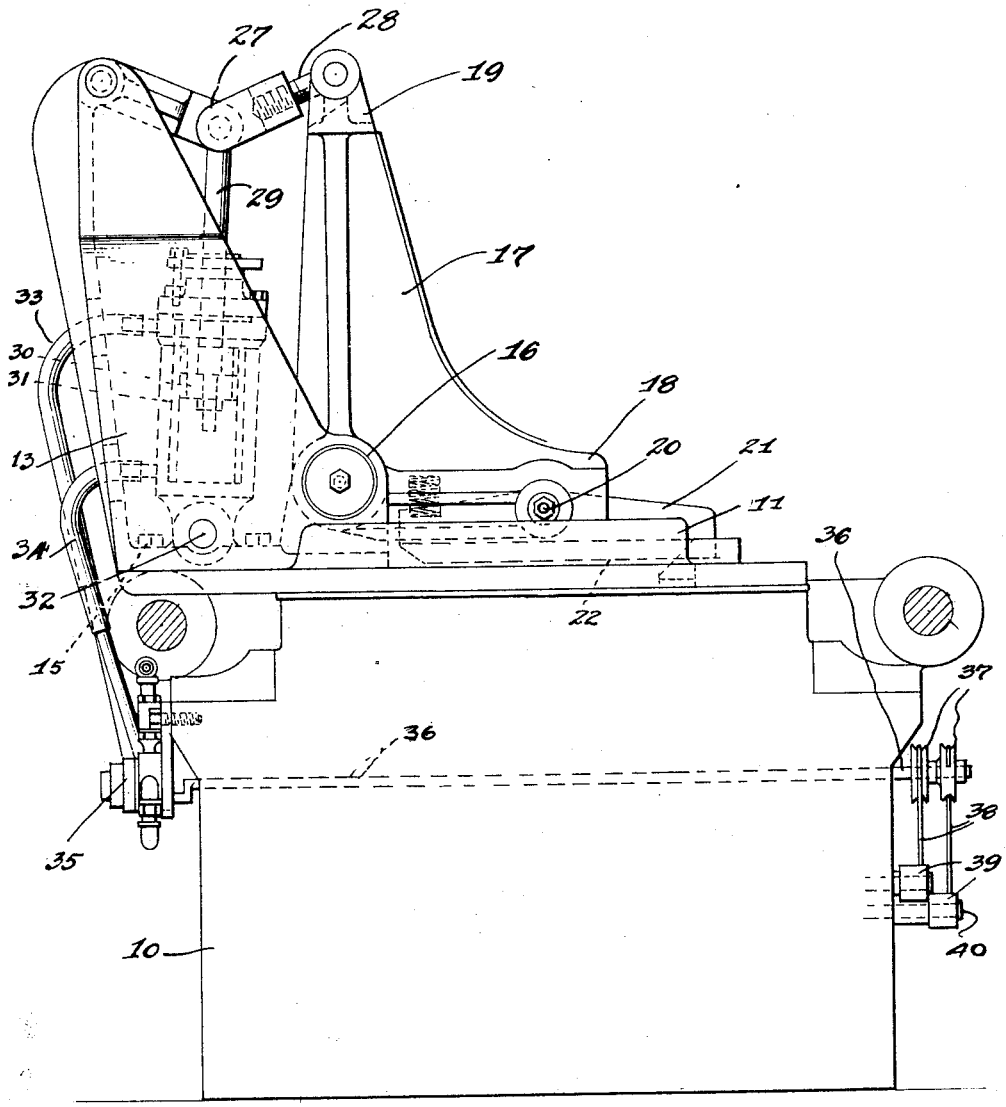
Figure 1 is an elevational view partly in section of a conventional form of welding apparatus equipped with clamping mechanism constructed in accordance with this invention.
Figure 2:
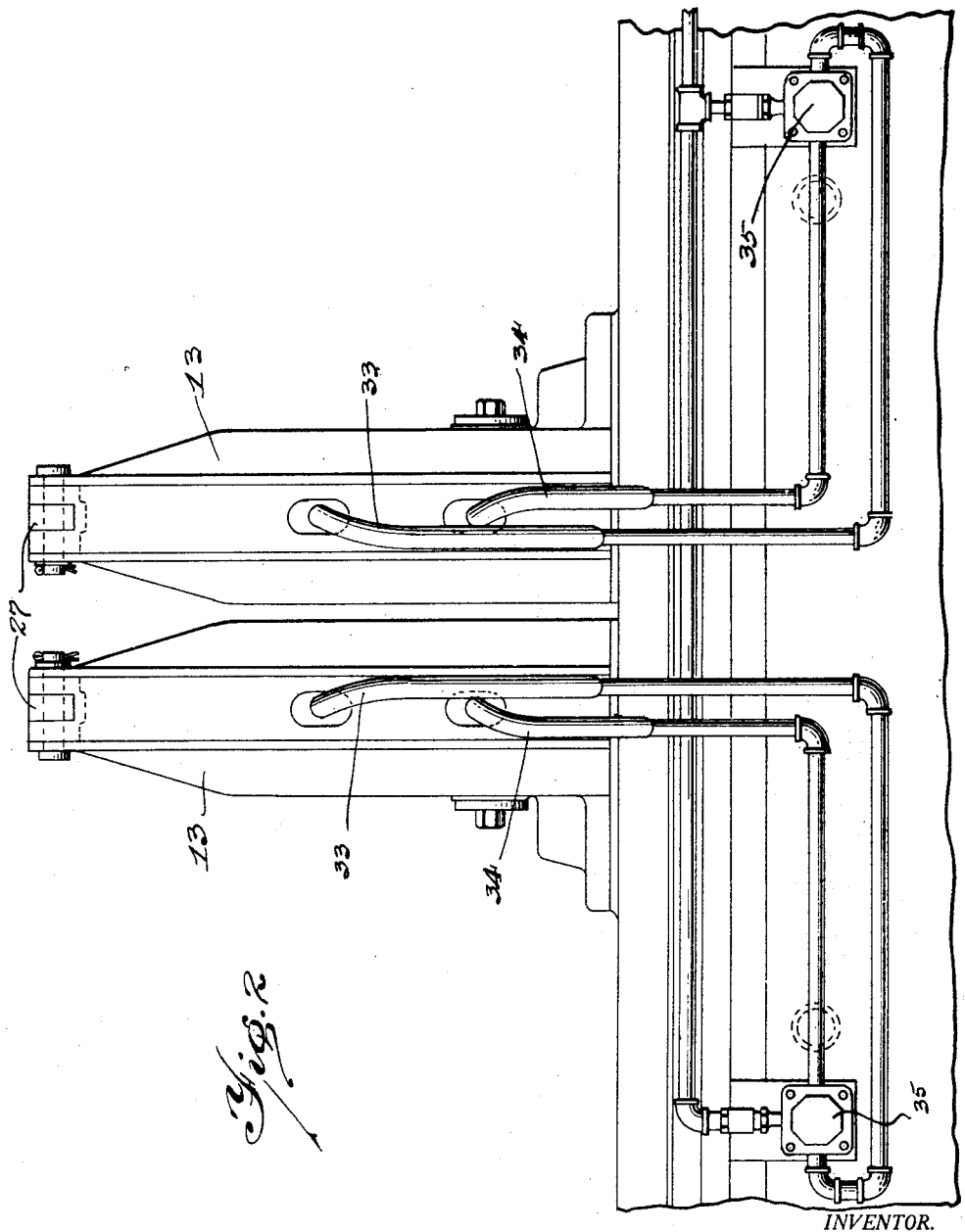
Figure 2 is a fragmentary side elevational view of the welding machine showing the pair of clamps in side elevation.
Figure 3:
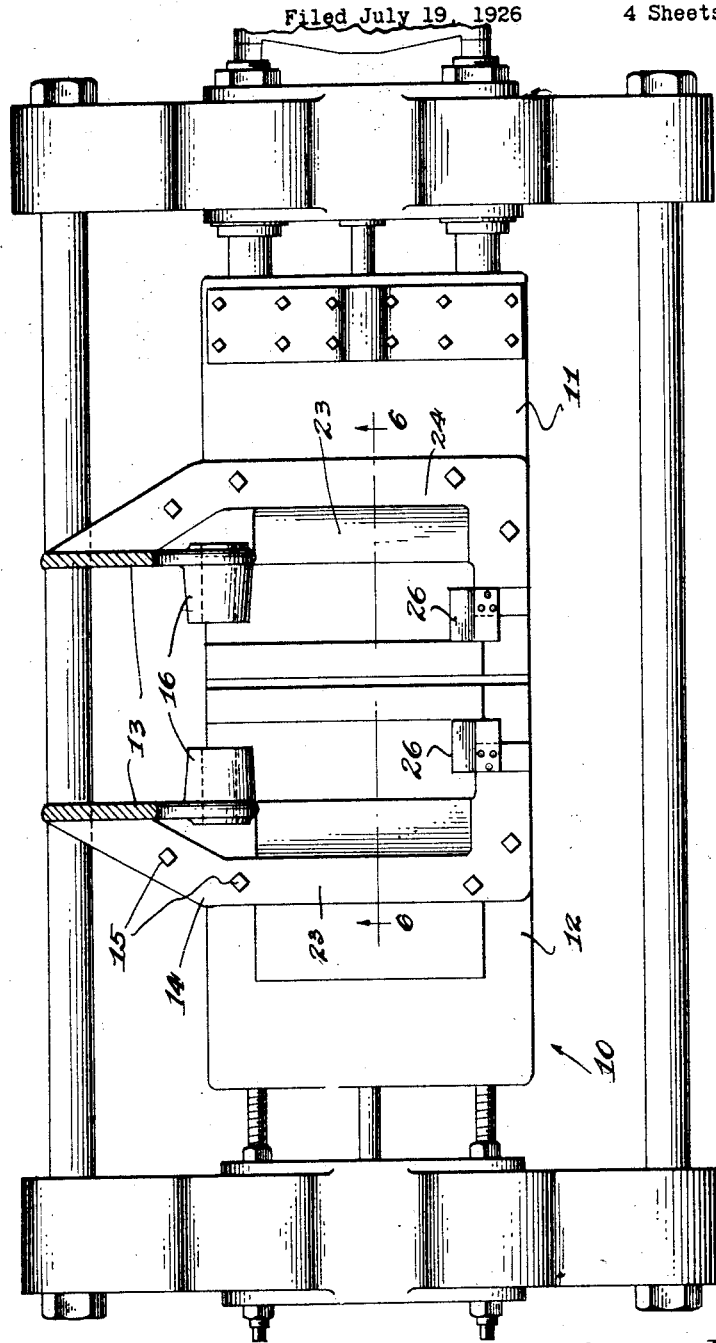
Figure 3 is a plan view partly in horizontal section with certain parts of the clamps removed.

Referring now particularly to the drawings wherein like reference characters indicate like parts, it will be noted that there is illustrated a conventional form of welding machine 10 having a movable table portion 11 and a stationary portion 12 to which the pieces to be welded are adapted to be clamped. As the particular form of welding machine forms no part of the present invention the same is referred to and illustrated only generally.

Obviously a pair of clamping members will be provided for holding respectively the two pieces to be wielded or as shown in Figure 6 for clamping the ends of a rim R adapted to be welded together at the point W.

Each clamp consists of an upright 13 having a laterally extending base flange 14 secured as for instance by means of bolts 15 to either the stationary or movable bed 11 or 12 of the welding apparatus. This upright is provided with a boss 16 forming the pivot bearing or mounting for a bell crank lever 17. Each bell crank lever includes a relatively short arm 18 and a relatively longer arm 19 arranged substantially horizontally and vertically respectively. Pivotally mounted as at 20 adjacent the end of the shorter arm 18 of the bell crank lever is a work engaging shoe 21 of substantially rectangular shape in plan view, the point of pivotal support thereof 20 being at the longitudinal center of the shoe. The lower or work engaging face 22 of each shoe will preferably be serrated or otherwise roughened so as to more readily grip the work. By pivotally connecting the shoe 21 to the bell crank lever the shoe is rockably supported and may consequently adjust itself to varying inclinations in the position of the workpiece and furthermore will compensate for wear thereto and to the cooperating stationary member forming the fixed clamping element.

Mounted for cooperation with each clamp is a fixed work support 23 having an upwardly directed extension 24 provided with a bowed or inclined upper face for engagement with the rim R and with a rest or support 25 which cooperates with the shoe 21 to rigidly grip the workpiece adjacent the welding point. Each work support 23 is recessed for the reception of an abutment block 26 against which the outer end of the shoe 21 engages. It will be noted that the abutment block 26 and the short arm 18 of the bell crank lever 17 cooperate to longitudinally support the shoe 21 and hold the same against distortion or displacement as the movable bed 11 of the welding apparatus is moved toward the stationary bed 12 during the welding operation.

The upper end of the arm 19 of the bell crank lever is connected by means of a toggle 27 to the upper end of the upright 13. One of the toggle levers of this toggle joint may be provided with an extensible portion 28 so that the throw of the toggle may be varied to regulate the pressure exerted by the shoe 21. The joint of the toggle is connected by means of a rod 29 to a fluid pressure control device which includes a piston 30 connected to the end of the rod 29 which piston works in a cylinder 31 pivotally connected as at 32 to the base of the upright. Fluid pressure such as compressed air is supplied and exhausted from both ends of the cylinder 31 by means of conduits 33 and 34 leading from a suitable valve 35. Thus air may be admitted for instance through conduit 34 to the lower end of the cylinder to force the piston upwardly to thus straighten the toggle and simultaneously exhausted through conduit 33 from the upper end of the cylinder. Thus the bell crank lever is positively operable in either direction.

Each valve 35 will preferably be separately controlled by means of a shaft 36 which for the purpose of convenience will be extended transversely over the welding machine to one side thereof. Keyed to this shaft is a pair of pulleys 37 extending oppositely around each of which is a cable or other flexible member 38. The free ends of these cables are connected to pedal levers 39 pivotally supported at one end as at 40 to the frame of the welding machine and provided at the other ends with pedals 41. Thus by depressing one of the pedal levers 39 the valve may be moved to one position during which time the other pedal 39 is raised. Then by depressing the raised pedal the valve may be operated into its other position.

Thus it will be seen that the fluid pressure operating means for each of the cylinders is provided with a remote or distant control. The control for each of the clamping devices may be adjacently located at the side of the machine as illustrated in the drawings so that the work may be inserted and both clamps conveniently operated by the operator. It is of course understood that the clamp structure just described is duplicated on the stationary and movable beds of the welding machine for holding the two parts to be welded. Obviously if found desirable both of the cylinders 31 of the two clamping devices might be simultaneously operated by a single set of control pedals 39 but the arrangement herein described has been found to be more satisfactory and convenient.

Owing to the ratio of the arm 19 to the arm 18 of the bell crank lever 17 and of the toggle lever operating means for the bell crank a tremendous pressure may be applied to the shoe 21 to positively grip and hold the workpiece between this shoe and the stationary support 25. Furthermore by means of the fluid pressure operating means the power may be quickly applied and also readily released so that both the clamping and releasing operations may be performed quickly.

Obviously the invention is capable of numerous changes both in the essential and the nonessential details and consequently reservation is made to make such changes as may come within the purview of the accompanying claims.

What I claim as my invention is:

1. In a clamp, the combination with a support, of a lever pivotally mounted thereon, work engaging means on one arm of said lever, movable means engaging the other arm for rocking said lever and means for adjusting the engagement of the movable means with the said arm to vary the throw of the lever independently of the movement of said movable means.

2. In a clamp, the combination with a support, of a lever pivotally mounted thereon, work engaging means on one arm of said lever and a toggle lever connected to the other arm of said lever for rocking the same, the connection between the toggle lever and arm being adjustable to vary the throw of the arm.

3. In a clamp, the combination with a fixed support, of a lever pivotally mounted thereon, work engaging means carried by one arm of said lever, a toggle lever connection between the other arm of said lever and said fixed support, fluid pressure means for operating said toggle lever, a valve controlling the inlet and exhaust of the fluid pressure to both ends of the cylinder of said fluid pressure means and pedal control means for operating said valve, said means including a rotatable shaft and a plurality of pedals for oppositely rotating the said shaft.

4. In a device of the character described, a rockably supported lever, means connected to one arm of said lever for rocking the same, a work engaging shoe pivotally mounted on the other arm of said lever, a fixed work rest cooperating with said shoe for clamping the work and an abutment block positioned for engagement by one end of said shoe, for guiding the shoe during rocking of the lever.

5. In a clamp, the combination with a bed, of a lever pivotally associated with the bed, work engaging means carried by one arm of the lever, means engaging the other arm for rocking the lever, and means carried by the bed and guidingly engaging the said work engaging means for preventing distortion of the same.

6. In a clamp, the combination with a bed, of a lever pivotally associated therewith, a relatively elongated work engaging member pivotally mounted on one end of the said lever, a toggle lever connected to the other arm of said lever for rocking the same, and an abutment block carried by the bed and engaging the said elongated work engaging member for preventing distortion of the same.

7. In a clamp, the combination with a support, of a lever pivotally mounted thereon, a stud extending laterally from the end of one arm of the said lever, a relatively elongated work engaging shoe rockably supported on the said stud, and means engaging the other arm of the said lever for rocking the same.

8. In a clamp, a pivoted lever, a work engaging shoe rockably supported by said lever, a work rest cooperating with said shoe for clamping the work, and a member carried by said work rest and engageable with one end of said shoe at a point spaced from its point of rocking support to prevent distortion of the shoe.

In testimony whereof I affix my signature.
IRVING H. JUDD.